(12) United States Patent
Yang et al.

(10) Patent No.: US 12,505,060 B2
(45) Date of Patent: Dec. 23, 2025

(54) METHOD TO SELECT PHYS AND A CONFIGURATION OF THE DATA PATH IN A MULTI PHY DRAM

(71) Applicant: Samsung Electronics Co., Ltd., Suwon-si (KR)

(72) Inventors: Yunseok Yang, Suwon-si (KR); Yunkyeong Jeong, Suwon-si (KR); Jaewoo Shin, Suwon-si (KR); Minhwan An, Suwon-si (KR); Jin Suk Chung, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 7 days.

(21) Appl. No.: 18/485,706

(22) Filed: Oct. 12, 2023

(65) Prior Publication Data
US 2024/0362178 A1    Oct. 31, 2024

(30) Foreign Application Priority Data
Apr. 25, 2023 (KR) .................. 10-2023-0054114

(51) Int. Cl.
*G06F 13/40* (2006.01)
*G06F 13/16* (2006.01)

(52) U.S. Cl.
CPC ...... *G06F 13/4068* (2013.01); *G06F 13/1673* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 9,280,298 B2 | 3/2016 | Kikuchi | |
| 9,324,397 B1 | 4/2016 | Desai et al. | |
| 9,430,434 B2 | 8/2016 | Lo et al. | |
| 9,652,020 B2 | 5/2017 | Wietfeldt | |
| 9,952,945 B2 | 4/2018 | Matsuo | |
| 9,984,032 B2 | 5/2018 | Kwon | |
| 10,573,368 B2 | 2/2020 | Biswas et al. | |
| 10,642,538 B1 | 5/2020 | MacLaren et al. | |
| 11,561,919 B2 | 1/2023 | Kim | |
| 12,119,080 B1 * | 10/2024 | Menon | G11C 7/1063 |
| 2010/0091537 A1 * | 4/2010 | Best | G11C 11/4093 365/220 |

(Continued)

OTHER PUBLICATIONS

Extended European Search Report for European Application No. 23208292.5 mailed Apr. 22, 2024.

*Primary Examiner* — Idriss N Alrobaye
*Assistant Examiner* — Dayton Lewis-Taylor
(74) *Attorney, Agent, or Firm* — Harness, Dickey & Pierce P.L.C.

(57) ABSTRACT

A memory device includes a first physical interface, a second physical interface, a first memory core, a second memory core, and a setting circuit. The first memory core is assigned to the first physical interface and includes a plurality of first stacked memory dies and connected via a through electrode. The second memory core is assigned to the second physical interface and includes a plurality of second stacked memory dies connected via a through electrode. The setting circuit sets at least one physical interface to be used for connection with an external device of the memory device among the first physical interface and the second physical interface.

20 Claims, 11 Drawing Sheets

(56) References Cited

U.S. PATENT DOCUMENTS

| | | | |
|---|---|---|---|
| 2014/0192583 A1* | 7/2014 | Rajan | G11C 7/10 |
| | | | 365/63 |
| 2017/0337144 A1 | 11/2017 | Ware et al. | |
| 2018/0137067 A1 | 5/2018 | Ware et al. | |
| 2019/0259743 A1* | 8/2019 | Han | H01L 25/0657 |
| 2021/0373811 A1 | 12/2021 | Vogelsang | |

* cited by examiner

600

METHOD TO SELECT PHYS AND A CONFIGURATION OF THE DATA PATH IN A MULTI PHY DRAM

CROSS-REFERENCE TO RELATED APPLICATION

This application claims priority to and the benefit of Korean Patent Application No. 10-2023-0054114 filed in the Korean Intellectual Property Office on Apr. 25, 2023, the entire contents of which are incorporated herein by reference in its entirety.

BACKGROUND

(a) Field

The disclosure relates to memory devices and electronic devices including the same.

(b) Description of the Related Art

High bandwidth memory (HBM) has been introduced to enhance data processing speed. The Joint electron device engineering council (JEDEC) has recently released the HBM3 standard and is now working on defining a next version (HBM4). The JEDEC is planning to incorporate multiple (e.g., two) physical interfaces for HBM3 into the HBM4 standard, which means that memory devices produced under the HBM4 standard may not be compatible with products utilizing HBM3.

SUMMARY

The inventive concepts provide memory devices and electronic devices including the same that may provide compatibility.

According to some example embodiments, a memory device may include a first physical interface, a second physical interface, a first memory core assigned to the first physical interface, a second memory core assigned to the second physical interface, and a setting circuit. The first memory core may include a plurality of first stacked memory dies connected via a first through electrode. The second memory core may include a plurality of second stacked memory dies connected via a second through electrode. The setting circuit may set at least one physical interface to be used for connection with an external device of the memory device among a plurality of physical interfaces including the first physical interface and the second physical interface.

According to some example embodiments, a memory device may include a plurality of physical interfaces including a first physical interface and a second physical interface, a plurality of memory cores, a plurality of data input/output pins, and a setting circuit. The plurality of memory cores may be assigned to the plurality of physical interfaces, respectively. The plurality of data input/output pins may correspond to the plurality of physical interfaces, respectively, may be used for connection with an external device of the memory device, and may include a first data input/output pin corresponding to the first physical interface. The setting circuit may selectively connect the first physical interface to the first data input/output pin or the second physical interface.

According to some example embodiments, an electronic device may include a computing device and a memory device. The memory device may include a plurality of physical interfaces, a plurality of memory cores, and a setting circuit. The plurality of physical interfaces may include a first physical interface connected to the computing device and a second physical interface. The plurality of memory cores may be assigned to the plurality of physical interfaces, respectively, and each of the plurality of memory cores may include a plurality of stacked memory dies connected via a through electrode. The setting circuit may selectively connect the second physical interface to the computing device or the first physical interface.

BRIEF DESCRIPTION OF THE DRAWINGS

Example embodiments will be more clearly understood from the following detailed description taken in conjunction with the accompanying drawings in which.

DETAILED DESCRIPTION

Figure 1:
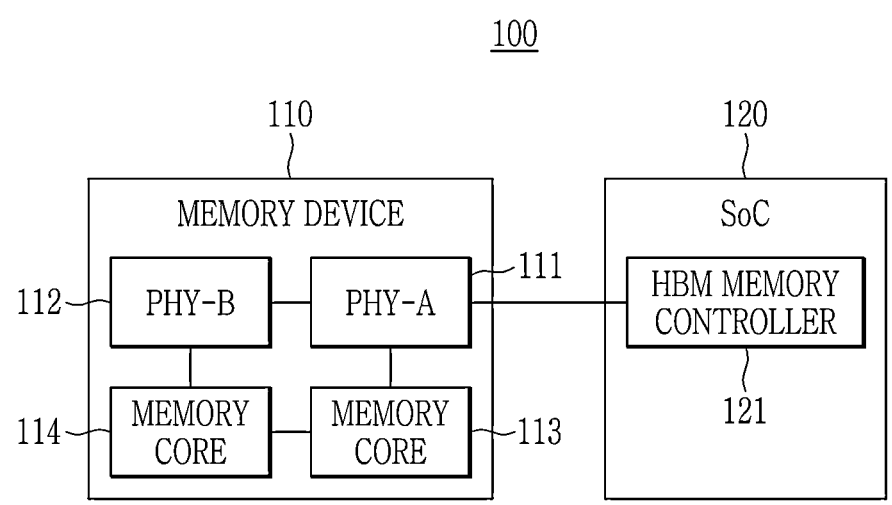
FIG. 1 is a block diagram illustrating an example of an electronic device according to some example embodiments.

The present inventive concepts will be described more fully hereinafter with reference to the accompanying drawings, in which some example embodiments of the present inventive concepts are shown. As those skilled in the art would realize, the described example embodiments may be modified in various different ways, all without departing from the spirit or scope of the present inventive concepts.

Accordingly, the drawings and description are to be regarded as illustrative in nature and not restrictive. Like reference numerals designate like elements throughout the specification. The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

As used herein, when an element (e.g., first element) is referred to as being "connected" to another element (e.g., second element), it may be directly connected or coupled directly to the other element, or electrically connected or coupled to the other element via any other element (e.g., third element). Further, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

Figure 2:
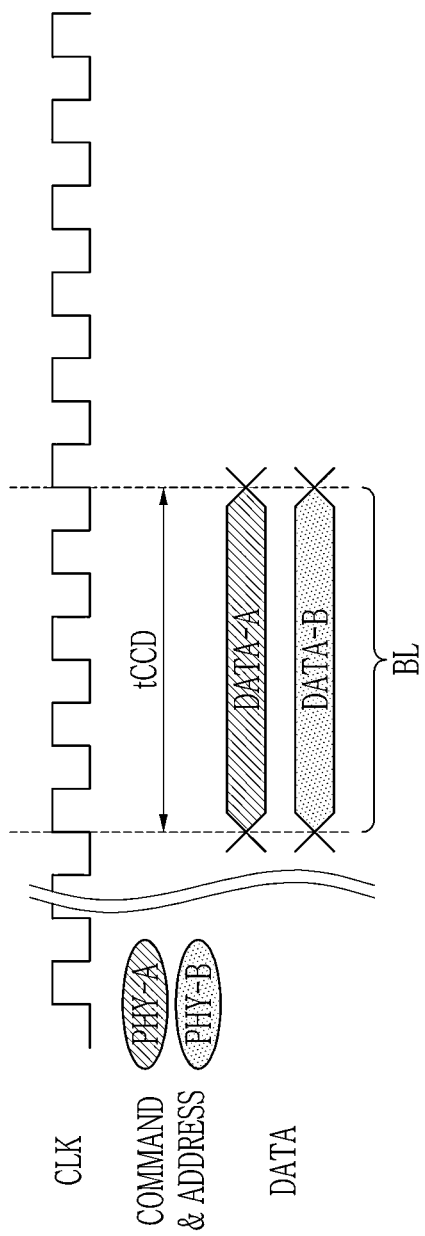
FIG. 2 is a diagram illustrating an example of signal timing in an electronic device according to some example embodiments.
Figure 3:
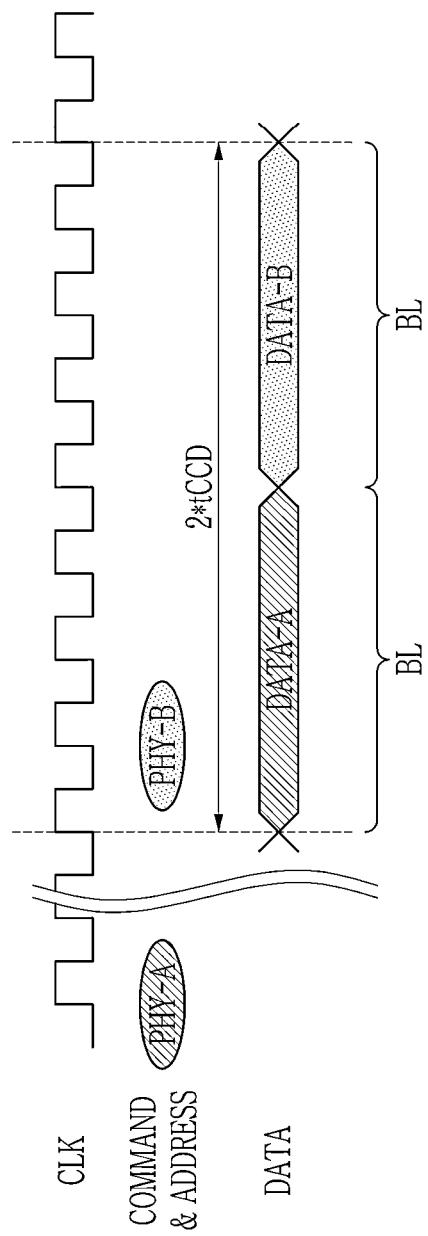
FIG. 3 is a diagram illustrating an example of signal timing in an electronic device according to some example embodiments.

FIG. 1 is a block diagram illustrating an example of an electronic device according to some example embodiments, and FIGS. 2 and 3 are each diagrams illustrating an example of signal timing in an electronic device according to some example embodiments.

Referring to FIG. 1, an electronic device 100 may include a memory device 110 and an external device 120. In some example embodiments, the electronic device 100 may be formed as a system in package (SiP).

The memory device 110 may include a plurality of physical interfaces PHY-A 111 and PHY-B 112 that connect with the external device 120 and a plurality of memory cores 113 and 114 respectively assigned to the plurality of physical interfaces 111 and 112. The physical interfaces 111 and 112 may be referred to as physical layers (PHY). Although FIG. 1 shows two physical interfaces 111 and 112 for convenience, the number of physical interfaces 111 and 112 are not limited thereto. Further, in FIG. 1, the physical interface 111 is denoted as "PHY-A" and the physical interface 112 is denoted as "PHY-B". In some example embodiments, the memory device 110 may be a stacked memory device wherein a plurality of dies are stacked. The stacked memory device may be, for example, a high bandwidth memory (HBM) or a hybrid memory cube (HMC). The HBM may include HBM, HBM2, HBM2E, HBM3, or a next generation of HBM, adopted by JEDEC as an industry standard. In some example embodiments, the memory cores 113 and 114 may be, by way of a non-limiting example embodiments, dynamic random-access memory (DRAM) cores.

In some example embodiments, the external device 120 may be a computing device including a processor that performs various computations for applications supported by the electronic device 100, which may be, by way of a non-limiting examples, a system on chip (SoC). Hereinafter, the external device 120 is described as the SoC 120. In some example embodiments, the SoC 120 may include, by way of a non-limiting examples, a central processing unit (CPU), a graphics processing unit (GPU), an accelerator, an application processor (AP), a neural processing unit (NPU), a vision processing unit (VPU), an image signal processor (ISP), or a digital signal processor (DSP), but example embodiments are not limited thereto. The SoC 120 may include a memory controller 121 that is connected to the memory device 110 and controls the memory device 110. In some example embodiments, the memory controller 121 may be, by way of a non-limiting examples, an HBM memory controller. The HBM memory controller may be referred to as an HBM memory subsystem.

In some example embodiments, when the physical interface 111 is selected from among the plurality of physical interfaces 111 and 112 as a physical interface to be used for connection with the SoC 120, the memory device 110 may send and receive signals to and from the SoC 120 via the physical interface 111. For example, the memory device 110 may receive a command and an address from the SoC 120 via the physical interface 111, and may receive data from the SoC 120 via the physical interface 111 and write the data, or may read data and send the data to the SoC 120 via the physical interface 111. In some example embodiments, the physical interface 111 may be selected when the SoC 120 supports one physical interface as in HBM3. For example, the memory device 110 may use, for example, the same per-pin speed as the HBM3 via the physical interface 111.

In some example embodiments, when the physical interface 112 is selected from among the plurality of physical interfaces 111 and 112 as a physical interface to be used for connection with SoC 120, memory device 110 may send and receive signals to and from the SoC 120 via the physical interface 112. For example, the memory device 110 may receive a command and an address from the SoC 120 via the physical interface 112, and may receive data from the SoC 120 via the physical interface 112 and write the data, or may read data and send the data to the SoC 120 via the physical interface 112. In some example embodiments, the physical interface 112 may be selected when SoC 120 supports one physical interface as in HBM3. For example, the memory device 110 may use, for example, the same per-pin speed as the HBM3 via the physical interface 112.

In some example embodiments, when the plurality of physical interfaces 111 and 112 are selected as physical interfaces to be used for connection with the SoC 120, the memory device 110 may send and receive signals to and from the SoC 120 via the plurality of physical interfaces 111 and 112. For example, the memory device 110 may receive a command and an address from the SoC 120 via the physical interface 111, and may receive data from the SoC 120 via the physical interface 111 and write the data, or may read data and send the data to the SoC 120 via the physical interface 111. Further, in some example embodiments, the memory device 110 may receive a command and an address from the SoC 120 via the physical interface 112, and may receive data from the SoC 120 via the physical interface 112 and write the data, or may read data and send the data to the SoC 120 via the physical interface 112. In some example embodiments, the plurality of physical interfaces 111 and 112 may be selected when the SoC 120 supports two or more physical interfaces as in a next generation of HBM3.

In some example embodiments, when the SoC 120 supports the plurality of physical interfaces 111 and 112, the plurality of physical interfaces 111 and 112 may operate independently. As shown in FIG. 2, the SoC 120 may send a read command and an address for reading data from the memory core 113 assigned to the physical interface 111 and a read command and an address for reading data from the memory core 114 assigned to the physical interface 112 to the memory device 110. Data DATA-A read from the memory core 113 may be transferred to the SoC 120 via the physical interface 111 in response to the read command from the SoC 120, and data DATA-B read from the memory core 114 may be transferred to the SoC 120 via the physical interface 112 in response to the read command from the SoC 120. Accordingly, in some example embodiments, the transfer of the data (e.g., a data burst) DATA-A and DATA-B may take a column to column delay (tCCD) time (e.g., four clock cycles CLK) determined by a burst length BL of the memory device 110.

In some example embodiments, the physical interface 111 may be selected when the SoC 120 supports one physical interface. As shown in FIG. 3, in some example embodiments, the SoC 120 may send a read command and an address for reading data from the memory core 113 assigned to the physical interface 111 to the memory device 110, and may send a read command and an address for reading data from the memory core 114 assigned to the physical interface 112 to the memory device 110. For example, Data DATA-A read from the memory core 113 may be transferred to the SoC 120 via the physical interface 111 in response to the read command from the SoC 120. After the data DATA-A are transferred via the physical interface 111, in response to a read command from the SoC 120, data DATA-B read from the memory core 114 may be transferred from the physical interface 112 to the physical interface 111, and may be transferred to the SoC 120 via the physical interface 111. For example, since the data DATA-A are transferred before the data DATA-B are transferred, the transfer of data DATA-A and DATA-B may take a time (e.g., 8 clocks CLK) corresponding to twice the burst length BL of the memory device 110. For example, a tCCD time (e.g., 8 clocks CLK) equal to twice the tCCD time used when the plurality of physical interfaces 111 and 112 are supported may be used. In some example embodiments, when the SoC 120 supports one physical interface among N physical interfaces, a tCCD time (e.g., N times the burst length) equal to N times the tCCD time used when the N physical interfaces are supported may be used to transfer data for N memory cores assigned to the N physical interfaces.

As described above, in some example embodiments, by selecting the physical interface(s) to be used for connection with the SoC 120 from among the plurality of physical interfaces 111 and 112, the memory device 110 may be applicable to the SoC supporting a plurality of physical interfaces and the SoC supporting a single physical interface. Thus, for example, even if the memory device 110 is manufactured according to a next generation of HBM, the memory device 110 may be compatible with an SoC that supports HBM3.

Figure 4:
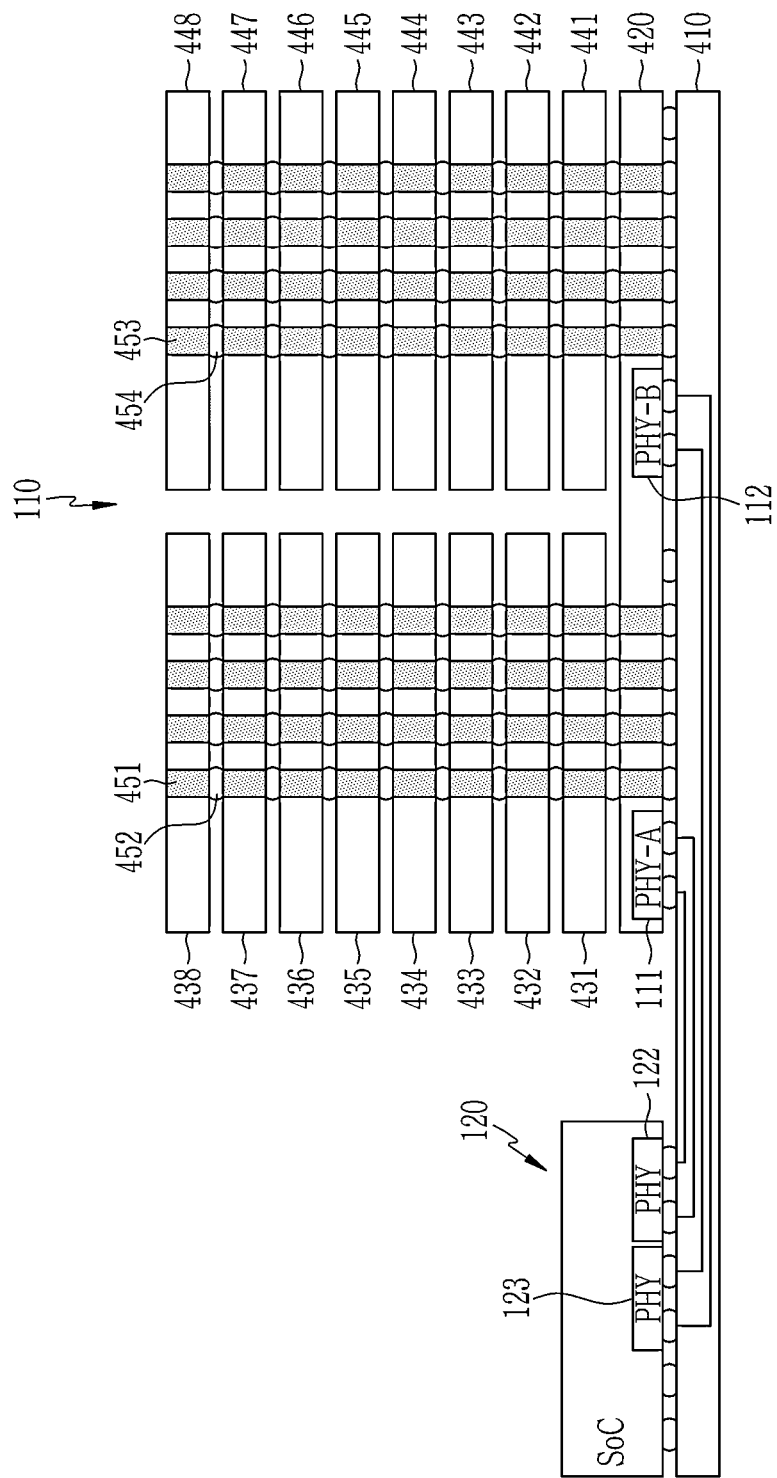
FIG. 4 is a diagram illustrating an example of an electronic device according to some example embodiments.
Figure 5:
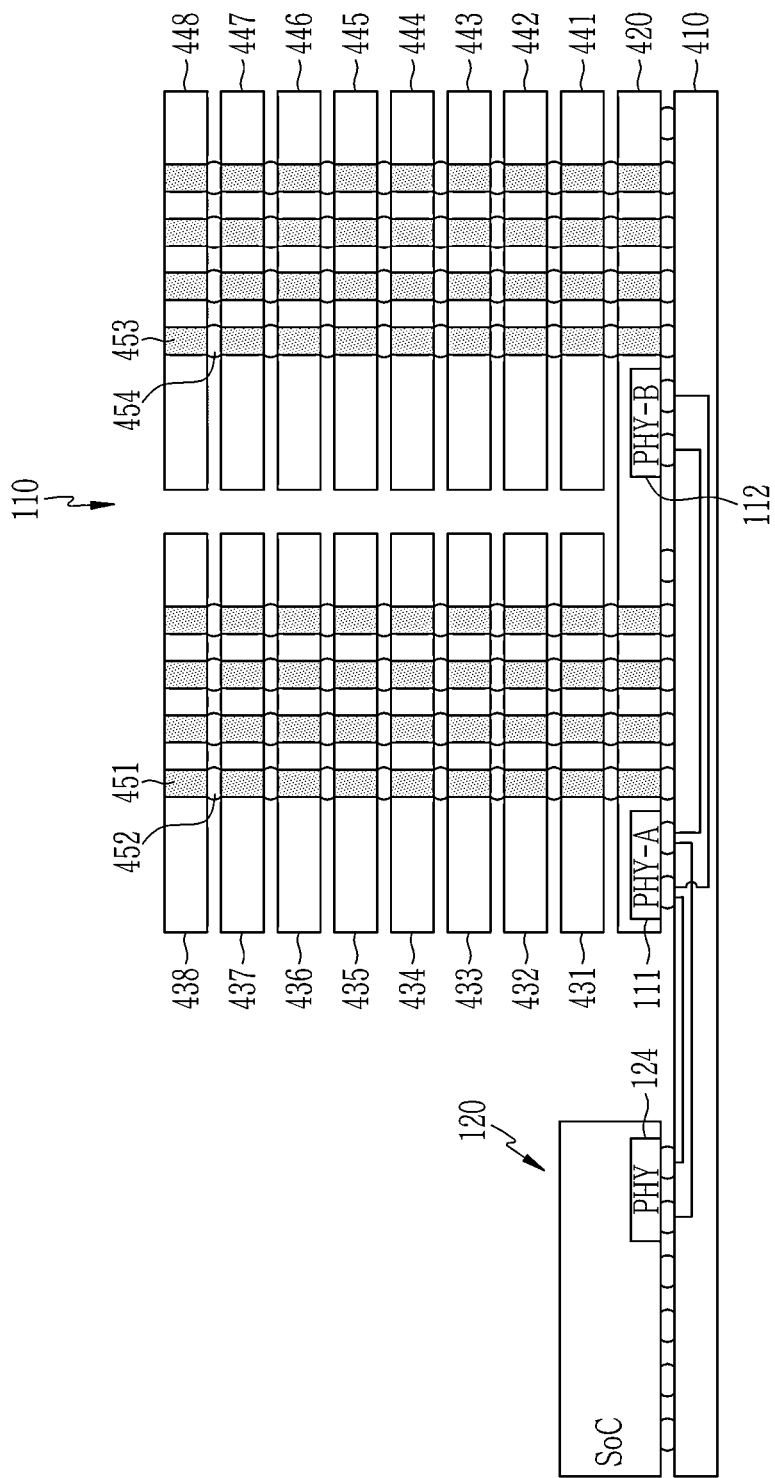
FIG. 5 is a diagram illustrating an example of an electronic device according to some example embodiments.

FIGS. 4 and 5 are each a drawing depicting an example of an electronic device according to some example embodiments.

Referring to FIGS. 1, 4, and 5, a memory device 110 and an SoC 120 may be deposed on an interposer 410. The memory device 110 may include a buffer die 420, a plurality of memory dies 431 to 438, and a plurality of memory dies 441 to 448. In some example embodiments, the buffer die 420 may be referred to as an "interface die", a "master die", or a "logic die". In some example embodiments, the memory dies 431 to 438 and 441 to 448 may be referred to as "core dies" or "slave dies". In some example embodiments, the die may be referred to as a "chip".

The buffer die 420 may be disposed on the interposer 410. The buffer die 420 may include a plurality of physical interfaces (PHY-A and PHY-B) 111 and 112 that connect to the SoC 120. In some example embodiments, the plurality of physical interfaces 111 and 112 may be disposed on the same buffer die 420. In some example embodiments, the buffer die 420 may further include control logic (not shown) that controls an operation of the memory device 400.

In some example embodiments, the plurality of memory dies 431 to 438 may be sequentially stacked on the buffer die 420. The memory dies 431 to 438 may form a memory core 113 assigned to the physical interface 111 of the buffer die 420. In FIGS. 4 and 5, the number of memory dies 431 to 438 is illustrated as, for example, eight, but example embodiments are not limited thereto. In some example embodiments, the memory dies 431 to 438 and the buffer die 420 may be connected to each other. In some example embodiments, the memory dies 431 to 438 and the buffer die 420 may be connected to each other via through electrodes 451 that penetrate the memory dies 431 to 438 and the buffer die 420. The through electrode 451 may be, by way of a non-limiting example embodiments, a through-silicon via (TSV). Hereinafter, the through electrode 451 is described as the TSV for convenience. In some example embodiments, the TSVs 451 of different dies are connected via micro bumps 452, and the physical interface 111 and the TSVs 451 of the buffer die 420 may also be connected to the interposer 410 via micro bumps 452. Locations of the TSVs 451 and the micro bumps 452 are not limited to illustration of FIGS. 4 and 5.

In some example embodiments, the plurality of other memory dies 441 to 448 may be sequentially stacked on the buffer die 420. The memory dies 441 to 448 may form a memory core 114 assigned to the physical interface 112 of the buffer die 420. In FIGS. 4 and 5, the number of memory dies 441 to 448 is illustrated as, for example, eight, but example embodiments are not limited thereto. The memory dies 441 to 448 and the buffer die 420 may be connected to each other. In some example embodiments, the memory dies 441 to 448 and buffer die 420 may be connected to each other via TSVs 453 that penetrate the memory dies 441 to 448 and the buffer die 420. In some example embodiments, the TSVs 453 of the different dies are connected via micro bumps 454, and the physical interface 112 and the TSVs 453 of the buffer die 420 may also be connected to the interposer 410 via micro bumps 454. Locations of the TSVs 453 and the micro bumps 454 are not limited to illustration of FIGS. 4 and 5.

In some example embodiments, the SoC 120 may store data required for computations in the memory device 110 or read data required for computations from the memory device 110. The interposer 410 may connect the memory device 110 and the SoC 120. In some example embodiments, the interposer 410 may provide a physical path for a connection between the memory device 110 and the SoC 120. The physical path may be formed using, by way of a non-limiting examples, a conductive material. The interposer 410 may be, by way of a non-limiting examples, a silicon interposer.

Referring to FIG. 4, in some example embodiments, the SoC 120 may support the plurality of physical interfaces 111 and 112 of the memory device 110. For example, the SoC 120 may include a plurality of physical interfaces 122 and 123 for the memory device 110. In some example embodiments, the physical interface 111 of the buffer die 420 may be connected to the physical interface 122 of the SoC 120 via the physical path of the interposer 410, and the physical interface 112 of the buffer die 420 may be connected to the physical interface 123 of the SoC 120 via the physical path of the interposer 410. Accordingly, in some example embodiments, a command and an address transmitted from the SoC 120 may be transferred to the memory cores 431 to 438 assigned to the physical interface 111 via the physical interfaces 122 and 111. In response to the command and the address, the memory cores 431 to 438 may receive data from the SoC 120 via the physical interfaces 122 and 111, and write the data, or may read data and transfer the data to the SoC 120 via the physical interfaces 122 and 111. Similarly, in some example embodiments, a command and an address transmitted from the SoC 120 may be transferred to the memory cores 441 to 448 assigned to the physical interfaces 112 via the physical interfaces 123 and 112. In response to the command and the address, the memory cores 441 to 448 may receive data from the SoC 120 via the physical interfaces 123 and 112, and write data, or may read data, and transfer the data to the SoC 120 via the physical interfaces 123 and 112.

Referring to FIG. 5, in some example embodiments, the SoC 120 may support one physical interface of the memory device 110. For example, the SoC 120 may include a physical interface 124 for the memory device 110. In some example embodiments, one (e.g., 111) of the physical interfaces 111 and 112 of the buffer die 420 may be connected to the physical interface 124 of the SoC 120 via the physical path of the interposer 410, and the other physical interface 112 of the buffer die 420 may be connected to the physical interface 111 of the buffer die 420. Accordingly, in some example embodiments, a command and an address transmitted from the SoC 120 may be transferred to the memory cores 431 to 438 assigned to the physical interface 111 via the physical interfaces 124 and 111. In response to the command and address, the memory cores 431 to 438 may receive data from the SoC 120 via the physical interfaces 124 and 111, and write the data, or may read the data and transfer the data to the SoC 120 via the physical interfaces 124 and 111. Further, in some example embodiments, a command and an address transmitted from the SoC 120 may be transferred to the memory cores 441 to 448 assigned to the physical interface 112 via the physical interfaces 124, 111, and 112. In response to the command and the address, the memory cores 441 to 448 may receive data from the SoC 120 via the physical interfaces 124, 111, and 112, and write data, or may read data and transfer the data to the SoC 120 via the physical interfaces 124, 111, and 112.

Figure 6:
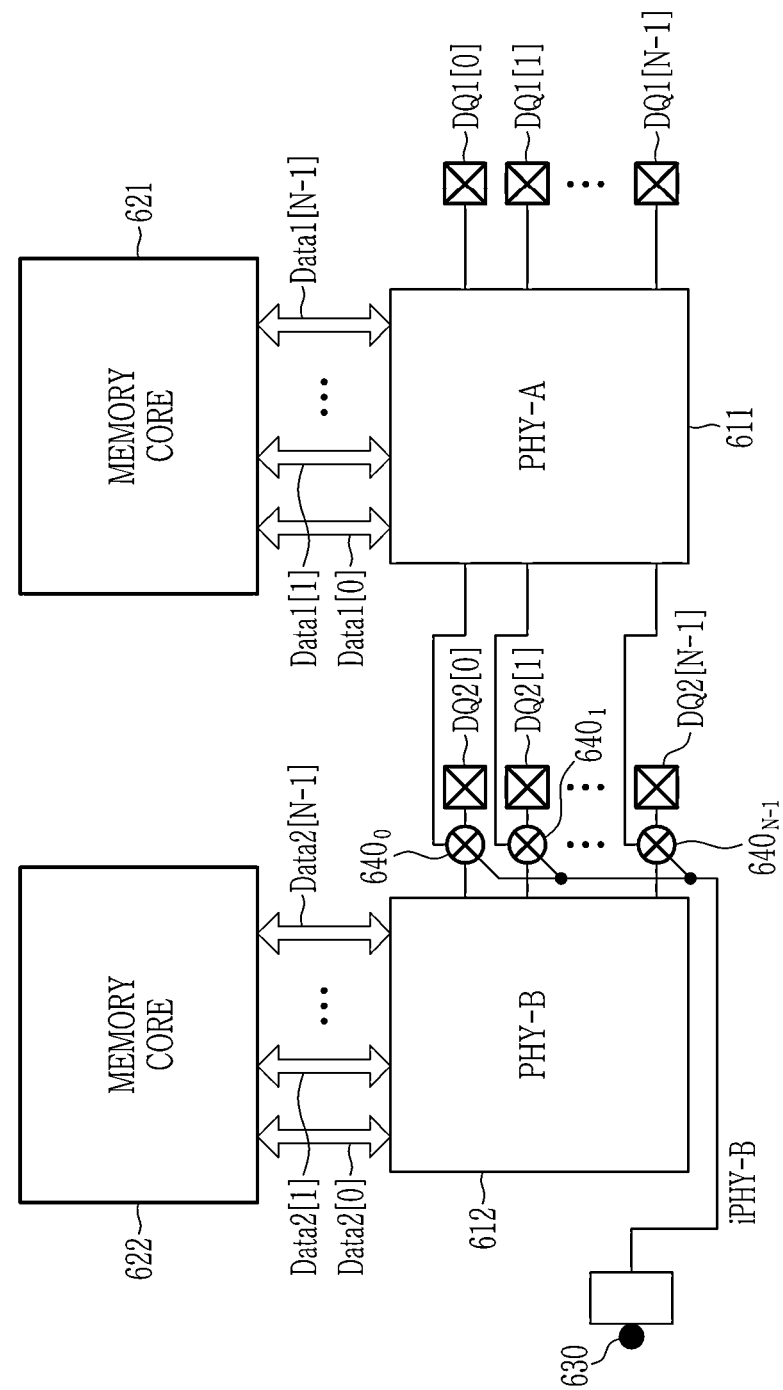
FIG. 6, FIG. 7, FIG. 8, FIG. 9, FIG. 10, and FIG. 11 are each a block diagram illustrating an example of a memory device according to some example embodiments.
Figure 7:
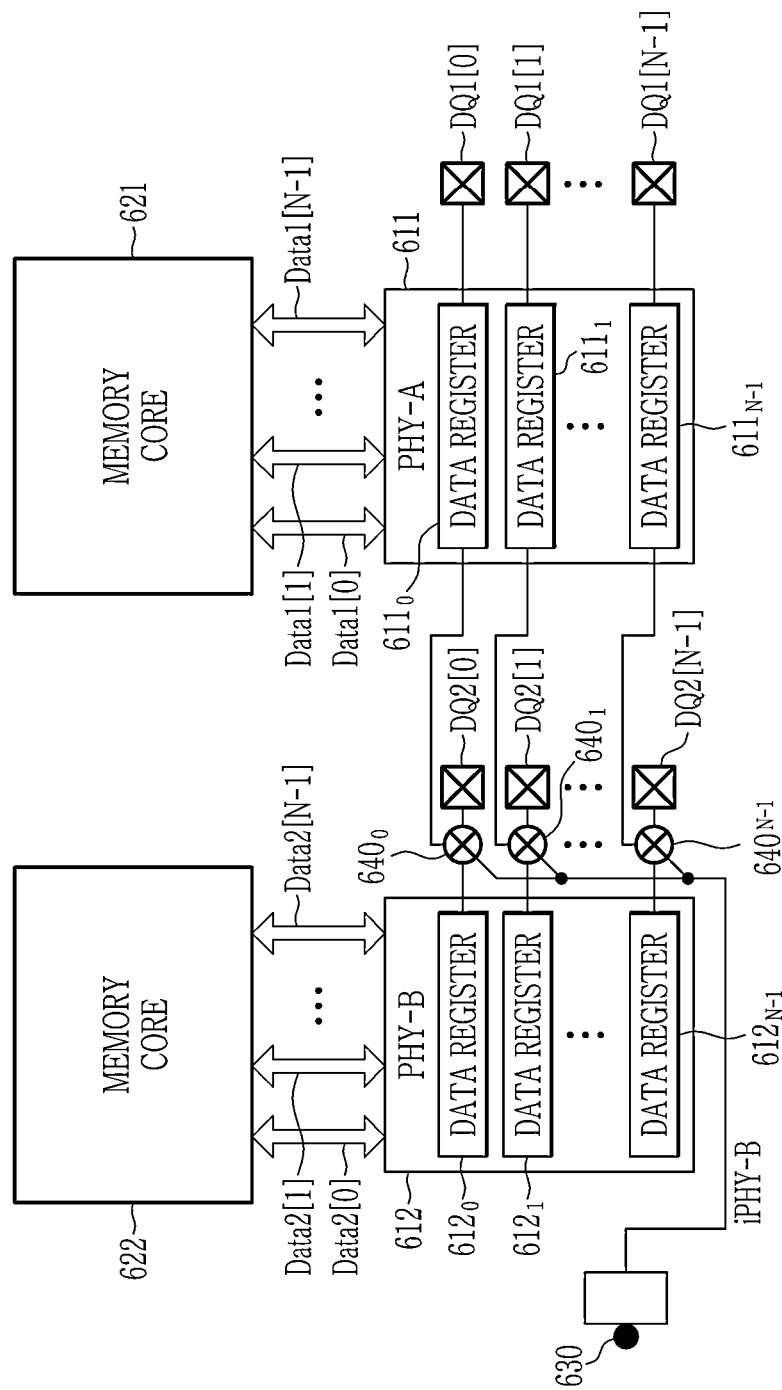
Figure 8:
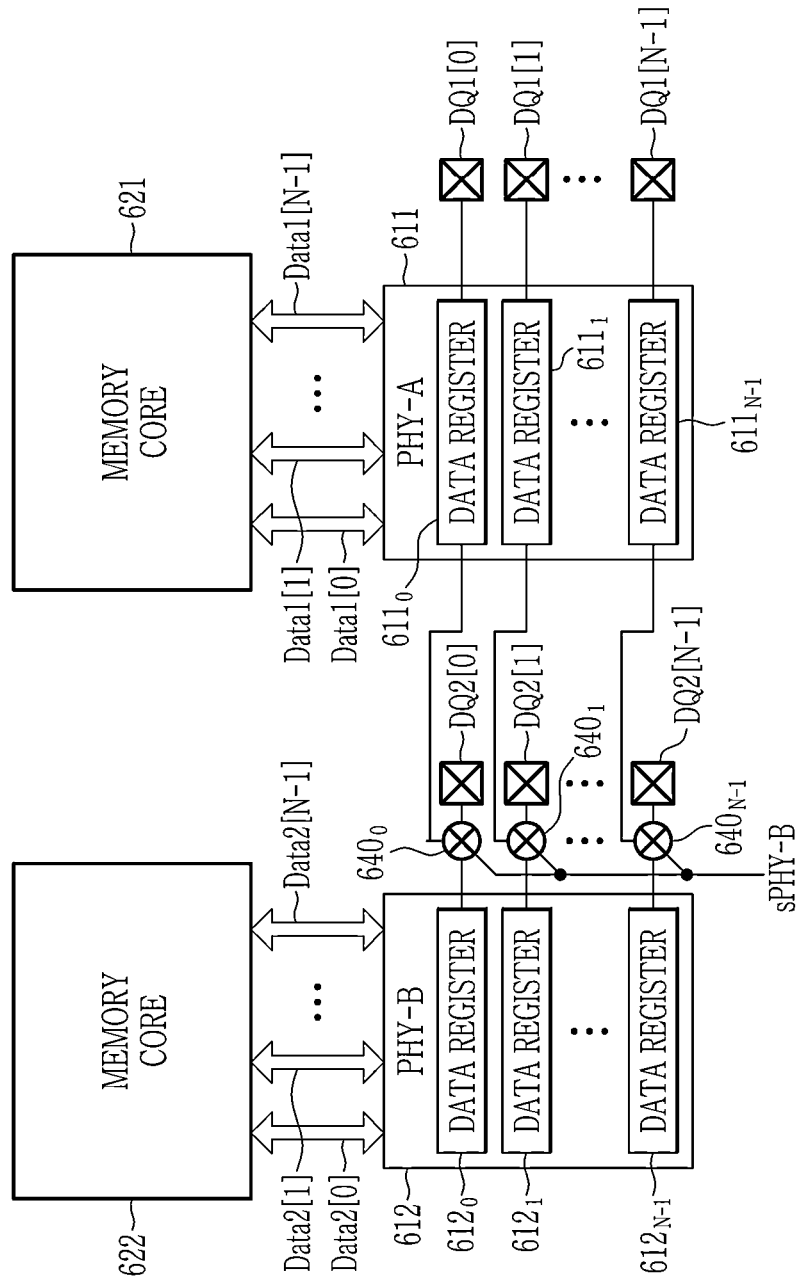

FIGS. 6, 7, and 8 are each a block diagram illustrating an example of a memory device according to some example embodiments.

Referring to FIG. 6, a memory device 600 may include a plurality of physical interfaces 611 and 612, and a plurality of memory cores 621 and 622 that corresponds to the plurality of physical interfaces 611 and 612, respectively. Although two physical interfaces 611 and 612 are shown for convenience in FIG. 6, the number of physical interfaces 611 and 612 are not limited thereto. Further, in FIG. 6, the physical interfaces 611 and 612 are denoted as "PHY-A" and "PHY-B", respectively.

In some example embodiments, each of the memory cores 621 and 622 may include a plurality of stacked memory dies connected via TSVs. Each memory die may include a memory cell array, and the memory cell array may include a plurality of memory cells. The memory cells may be, by way of a non-limiting examples, DRAM cells. The memory die may store data in a target memory cell of the memory cell array in response to a write command, and may read data from a target memory cell of the memory cell array in response to a read command.

In some example embodiments, the physical interface 611 may be connected to a data input/output (I/O) pin DQ1[0] to DQ1[N−1] of the memory device 600, and the physical interface 612 may be connected to other data I/O pin DQ2[0] to DQ2[N−1] of the memory device 600. In some example embodiments, a plurality of data I/O pins DQ1[0] to DQ1[N−1] and a plurality of data I/O pins DQ2[0] to DQ2[N−1] may be provided. The number of data I/O pins DQ1[0] to DQ1[N−1] and the number of data I/O pins DQ2[0] to DQ2[N−1] may be, by way of a non-limiting examples, 1024. In some example embodiments, the memory device 600 may be a stacked memory device in which the plurality of memory dies are stacked on a buffer die and the plurality of memory dies are connected to each other via TSVs, but example embodiments are not limited thereto.

In some example embodiments, when an SoC to which the memory device 600 is connected supports one physical interface, either the data I/O pins DQ1[0] to DQ1[N−1] or the data I/O pins DQ2[0] to DQ2[N−1] may be connected to the SoC via data wiring. In some example embodiments, the data I/O pins DQ1[0] to DQ1[N−1] are connected to the SoC via data wiring when the SoC supports one physical interface. In some example embodiments, when the SoC supports two or more physical interfaces, the data I/O pins DQ1[0] to DQ1[N−1] and the data I/O pins DQ2[0] to DQ2[N−1] may each be connected to the SoC via data wiring.

In some example embodiments, the physical interface 611 may be connected to the corresponding memory core 621 via a plurality of data channels Data1[0] to Data1[N−1], and the physical interface 612 may be connected to the corresponding memory core 622 via a plurality of data channels Data2[0] to Data2[N−1]. In some example embodiments, each data channel Data1[i] or Data2[i] may carry a plurality of bits (e.g., 64 bits). Here, i is an integer between 0 and N. In some example embodiments, the plurality of data channels Data1[0] to Data1[N−1] may correspond to the plurality of data I/O pins DQ1[0] to DQ1[N−1], respectively, and the plurality of data channels Data2[0] to Data2[N−1] may correspond to the plurality of data I/O pins DQ2[0] to DQ2[N−1], respectively. Accordingly, in some example embodiments, data transferred from the memory core 621 through the data channels Data1[0] to Data1[N−1] (e.g., data read from the memory core 621) may be output to the corresponding data I/O pins DQ1[0] to DQ1[N−1], respectively. Further, data input to the data I/O pins DQ1[0] to DQ1[N−1] (e.g., data to be written to the memory core 621) may be transferred to the memory core 621 through the corresponding data channels Data1[0] to Data1[N−1], respectively. Similarly, data transferred from the memory core 622 through the data channels Data2[0] to Data2[N−1] (e.g., data read from memory core 622) may be output to the corresponding data I/O pins DQ2[0] to DQ2[N−1], respectively. Further, data input to the data I/O pins DQ2[0] to DQ2[N−1] (e.g., data to be written to the memory core 622) may be transferred to the memory core 622 through the corresponding data channels Data2[0] to Data2[N−1], respectively.

In some example embodiment, the memory device 600 may include a setting circuit for setting at least one physical interface to be used for the connection with the SoC among the plurality of physical interfaces 611 and 612. In some example embodiments, the setting circuit may include a select pin 630 provided as a hardware pin. The select pin 630 may be used to select the physical interface to be used among the plurality of physical interfaces 611 and 612. In some example embodiments, the select pin 630 may be used to enable a physical interface (e.g., 612) among the physical interfaces 611 and 612.

In some example embodiments, the select pin 630 may be set such that the plurality of physical interfaces 611 and 612 are used for connection with the SoC. For example, the select pin 630 may be enabled. For example, the physical interface 611 may be connected to the data I/O pins DQ1[0] to DQ1[N−1], and physical interface 612 may be connected to the data I/O pins DQ2[0] to DQ2[N−1]. Accordingly, the physical interface 611 may output data transferred from the memory core 621 through each data channel Data1[i] (e.g., data read from the memory core 621) to the corresponding data I/O pin DQ1[i], and may transfer data input to each data I/O pin DQ1[i] (e.g., data to be written to the memory core 621) to the memory core 621 through the corresponding data channel Data1[i]. Similarly, the physical interface 612 may output data transferred from the memory core 622 through each data channel Data2[i] (e.g., data read from the memory core 622) to the corresponding data I/O pin DQ2[i], and may transfer data input to each data I/O pin DQ2[i] (e.g., data to be written to the memory core 622) to the memory core 622 through the corresponding data channel Data2[i].

In some example embodiments, the select pin 630 may be set such that the physical interface 612 is not used (e.g., physical interface 611 is used) for the connection with the SoC. For example, the select pin 630 may be disabled. For example, the physical interface 611 may be connected to the data I/O pins DQ1[0] to DQ1[N−1], and the physical interface 612 may be connected to the data I/O pins DQ1[0] to DQ1[N−1] via the physical interface 611. Accordingly, the physical interface 611 may output data transferred from the memory core 621 through each data channel Data1[i] (e.g., data read from the memory core 621) to the corresponding data I/O pin DQ1[i], and may transfer data input to each data I/O pin DQ1[i] (e.g., data to be written to the memory core 621) to the memory core 621 through the corresponding data channel Data1[i]. The physical interface 612 may output data transferred from the memory core 622 through each data channel Data2[i] (e.g., data read from the memory core 622) to the corresponding data I/O pin DQ1[i] via the physical interface 611. Further, the physical interface 612 may receive data input to each data I/O pin DQ1[i] (e.g., data to be written to the memory core 622) via the physical interface 611, and may transfer the received data to the memory core 622 through the corresponding data channel Data2[i].

In some example embodiments, the setting circuit may further include a plurality of select circuits $640_0$ to $640_{N-1}$. In some example embodiments, each select circuit $640_i$ may include, by way of a non-limiting example, a multiplexer or a switch. Each select circuit $640_i$ may selectively connect the physical interface 612 to a corresponding data I/O pin DQ2[i] or the physical interface 611. In some example embodiments, when the select pin 630 is set to use the plurality of physical interfaces 611 and 612 (e.g., when the select pin 630 is enabled), each select circuit $640_i$ may connect the physical interface 612 to the corresponding data I/O pin DQ2[i]. In some example embodiments, when the select pin 630 is set to not use the physical interface 612 (e.g., when the select pin 630 is disabled), each select circuit $640_i$ may connect the physical interface 612 to the physical interface 611.

In some example embodiments, a plurality of select circuits $640_0$ to $640_{N-1}$ may be connected to the select pin 630. A signal iPHY-B input to the select circuits $640_0$ to $640_{N-1}$ may have a predetermined level (e.g., a first level) in response to enabling the select pin 630, and each select circuit $640_i$ may connect the physical interface 612 to a corresponding data I/O pin DQ2[i] in response to the predetermined level of the signal iPHY-B. The signal iPHY-B input to the select circuits $640_0$ to $640_{N-1}$ may a level (e.g., a second level) different from the predetermined level in response to disabling the select pin 630, and each select circuit $640_i$ may connect the physical interface 612 to the physical interface 611 in response to the second level of the signal iPHY-B.

As described above, in some example embodiments, when the SoC supports two or more physical interfaces, the memory device 600 may be connected to the SoC via the plurality of physical interfaces 611 and 612, depending on the setting of the select pin 630. When the SoC supports one physical interface, the memory device 600 may be connected to the SoC via one physical interface 612, depending on the setting of the select pin 630.

Referring to FIG. 7, in some example embodiments, a physical interface 611 may include a plurality of data registers $611_0$ to $611_{N-1}$, and a physical interface 612 may include a plurality of data registers $612_0$ to $612_{N-1}$.

In some example embodiments, a select pin 630 may be set such that the plurality of physical interfaces 611 and 612 are used for connection with an SoC in a memory device 600. For example, the select pin 630 may be enabled. For example, the plurality of data registers $611_0$ to $611_{N-1}$ may be connected to a plurality of data I/O pins DQ1[0] to DQ1[N−1], respectively, and the plurality of data registers $612_0$ to $612_{N-1}$ may be connected to a plurality of data I/O pins DQ2[0] to DQ2[N−1], respectively. Accordingly, in a read operation, each data register $611_i$ of the physical interface 611 may output data read from the memory core 621 via a corresponding data I/O pin DQ1[i], and each data register $612_i$ of the physical interface 612 may output data read from the memory core 622 via a corresponding data I/O pin DQ2[i]. In a write operation, each data register $611_i$ of the physical interface 611 may receive data to be written to the memory core 621 via the corresponding data I/O pin DQ1[i], and each data register $612_i$ of the physical interface 612 may receive data to be written to the memory core 622 via the corresponding data I/O pin DQ2[i]. In some example embodiments, the plurality of data registers $611_0$ to $611_{N-1}$ may correspond to a plurality of data channels Data1[0] to Data1[N−1], respectively, and the plurality of data registers $612_0$ to $612_{N-1}$ may correspond to a plurality of data channels Data2[0] to Data2[N−1], respectively. Accordingly, each data register $611_i$ may receive data from the memory core 621 through the corresponding data channel Data1[i], and may transfer data to the memory core 621 through the corresponding data channel Data1[i]. Similarly, each data register $612_i$ may receive data from memory core 622 through a corresponding data channel Data2[i], and may transfer data to memory core 622 through the corresponding data channel Data2[i].

In some example embodiments, a select pin 630 may be set such that the physical interface 612 is not used (e.g., physical interface 611 is used) for the connection with the SoC. For example, the select pin 630 may be disabled. For example, the plurality of data registers $611_0$ to $611_{N-1}$ may be connected to the plurality of data I/O pins DQ1[0] to DQ1[N−1], respectively, and the plurality of data registers $612_0$ to $612_{N-1}$ may be connected to the plurality of data registers $611_0$ to $611_{N-1}$, respectively. Accordingly, in a read operation, each data register $611_i$ of the physical interface 611 may output data read from the memory core 621 via the corresponding data I/O pin DQ1[i], and then receive data read from the memory core 622 from a corresponding data register $612_i$ of the physical interface 612 and output the received data via the corresponding data I/O pin DQ1[i]. In a write operation, each data register $611_i$ of the physical interface 611 may receive data to be written to the memory core 622 via the corresponding data I/O pin DQ1[i] and transfer the received data to the corresponding data register $612_i$ of the physical interface 612, and then receive data to be written to the memory core 621 via the corresponding data I/O pin DQ1[i].

In some example embodiments, a plurality of select circuits $640_0$ to $640_{N-1}$ may correspond to the plurality of data registers $611_0$ to $611_{N-1}$ of the physical interface 611, respectively, may correspond to a plurality of data registers $612_0$ to $612_{N-1}$ of the physical interface 612, respectively, and may correspond to the plurality of data I/O pins DQ2[0] to DQ2[N−1], respectively. Each select circuit $640_i$ may selectively connect a corresponding data register $612_i$ of the physical interface 612 to a corresponding data I/O pin DQ2[i] or a corresponding data register $611_i$ of the physical interface 611. In some example embodiments, when the select pin 630 is set to use the plurality of physical interfaces 611 and 612, each select circuit $640_i$ may connect the corresponding data register $612_i$ of the physical interface 612 to the corresponding data I/O pin DQ2[i]. In some example embodiments, when the select pin 630 is set to disable the physical interface 612, each select circuit $640_i$ may connect the corresponding data register $612_i$ of the physical interface 612 to the corresponding data register $611_i$ of the physical interface 611.

In some example embodiments, a signal iPHY-B input to each select circuit $640_i$ may have a first level in response to enabling the select pin 630, and each select circuit $640_i$ may connect the corresponding data register $612_i$ of the physical interface 612 to the corresponding data I/O pin DQ2[i] in response to the first level of the signal iPHY-B. The signal iPHY-B input to each select circuit $640_i$ may have a second level in response to disabling the select pin 630, and each select circuit $640_i$ may connect the corresponding data register $612_i$ of the physical interface 612 to the corresponding data register $611_i$ of the physical interface 611 in response to the second level of the signal iPHY-B.

As described above, in some example embodiments, by setting the hardware pin 630, the memory device 600 may be used in both the SoC supporting the plurality of physical interfaces and the SoC supporting one physical interface.

Referring to FIG. 8, in some example embodiments, unlike the example embodiments described with reference to FIGS. 6 and 7, a select pin 630 may not be used to control activation of a physical interface 612. For example, a plurality of select circuits $640_0$ to $640_{N-1}$ may receive a control signal sPHY-B. In some example embodiments, a memory controller (e.g., 121 in FIG. 1) of an SoC to which a memory device 600 is connected may provide the control signal sPHY-B to the plurality of select circuits $640_0$ to $640_{N-1}$. In some other example embodiments, control logic formed on a buffer die (e.g., 420 in FIG. 4 or 5) of the memory device 600 may provide the control signal sPHY-B to the plurality of select circuits $640_0$ to $640_{N-1}$.

In some example embodiments, when a plurality of physical interfaces 611 and 612 are used, the control signal sPHY-B may have a predetermined level (e.g., a first level). In some example embodiments, when the physical interface 612 is not used, the control signal sPHY-B may have a level (e.g., a second level) different from the predetermined level. In response to the first level of the control signal sPHY-B, each select circuit $640_i$ may connect the physical interface 612 to a corresponding data I/O pin DQ2[i], or may connect a corresponding data register $612_i$ of the physical interface 612 to the corresponding data I/O pin DQ2[i]. In response to the second level of the control signal sPHY-B, each select circuit $640_i$ may connect the physical interface 612 to the physical interface 611, or connect the corresponding data register $612_i$ of the physical interface 612 to a corresponding data register $611_i$ of the physical interface 611.

As described above, in some example embodiments, by setting a level of the control signal sPHY-B provided to the memory device 600, the memory device 600 may be used in both the SoC supporting the plurality of physical interfaces and the SoC supporting one physical interface.

Figure 9:
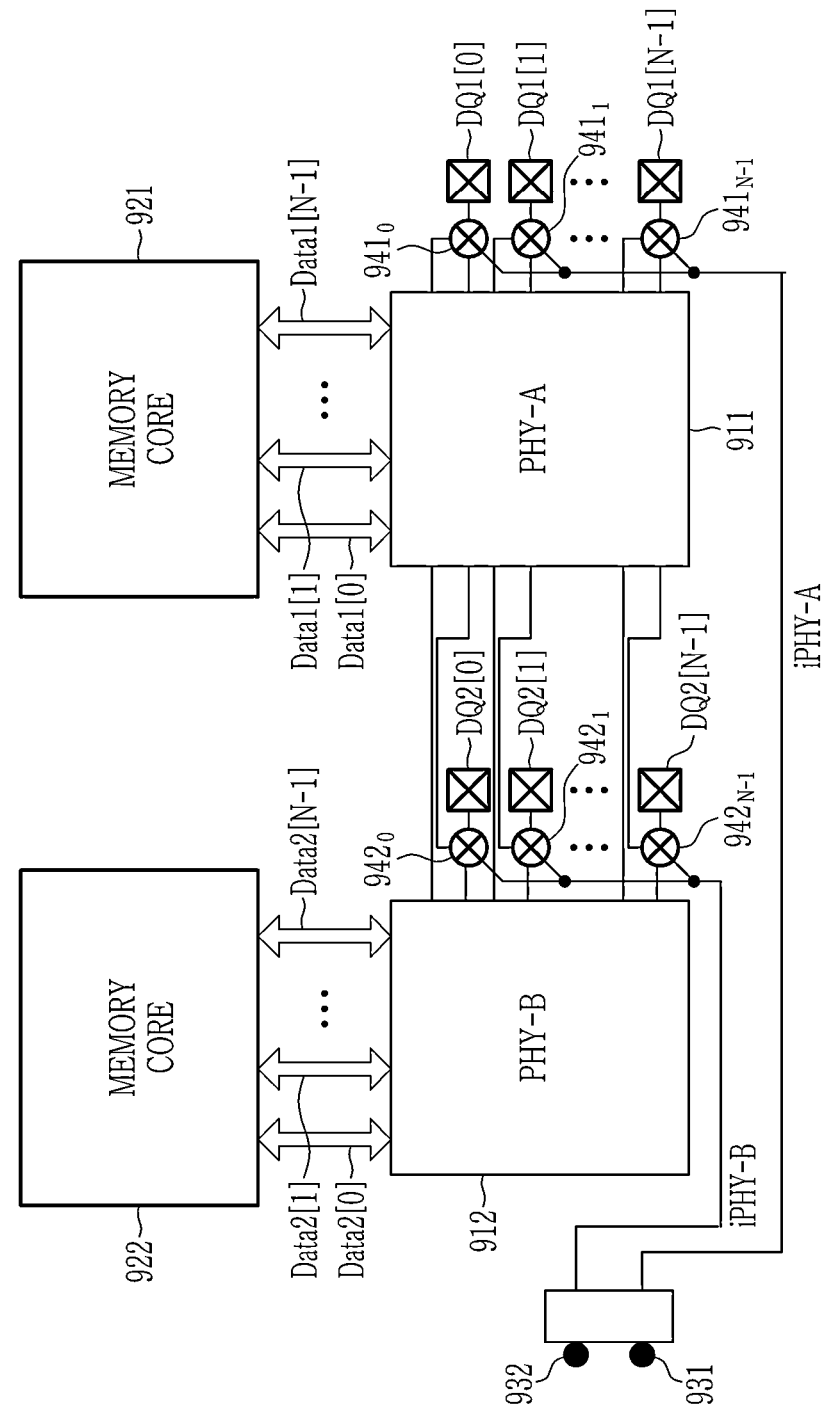
Figure 10:
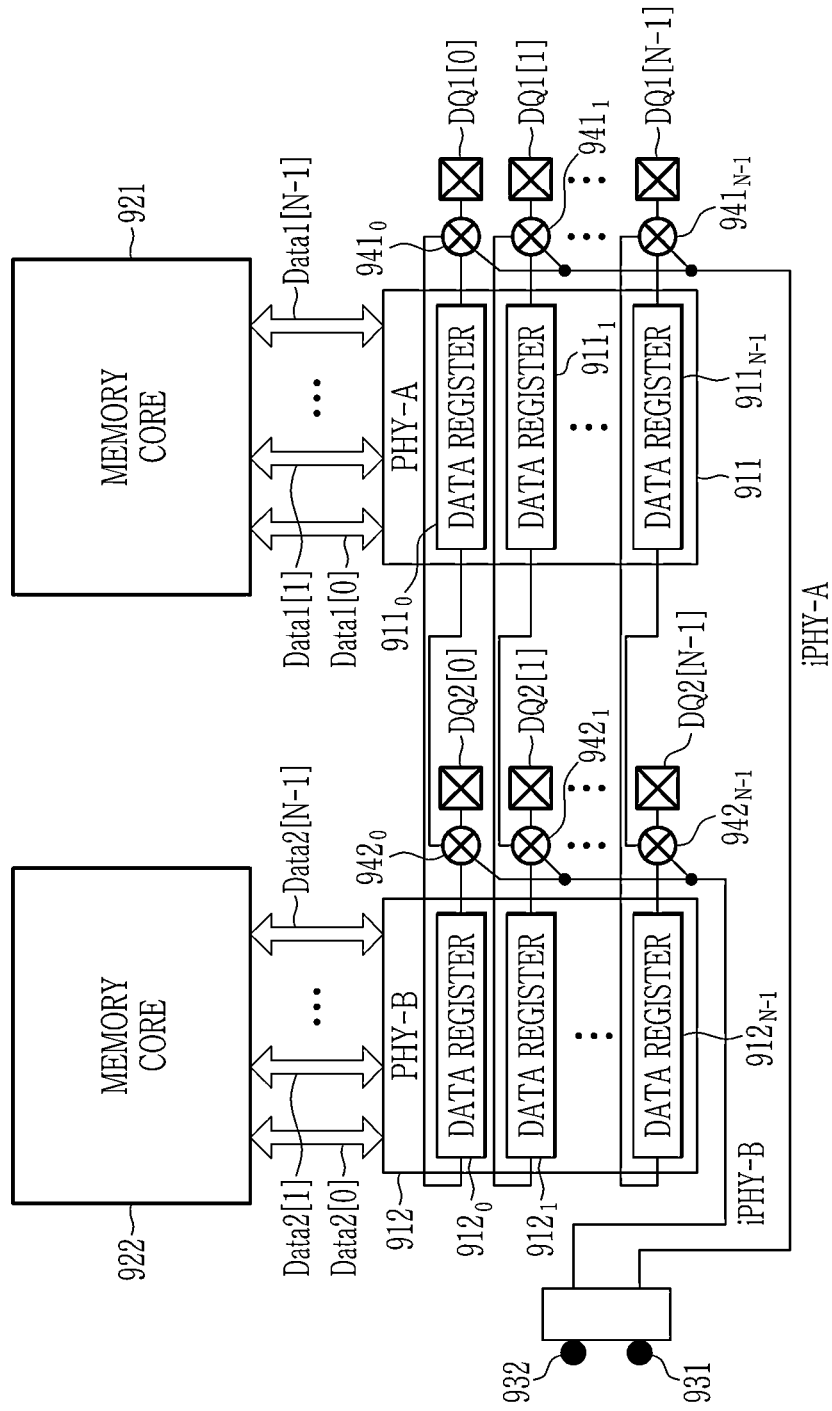
Figure 11:
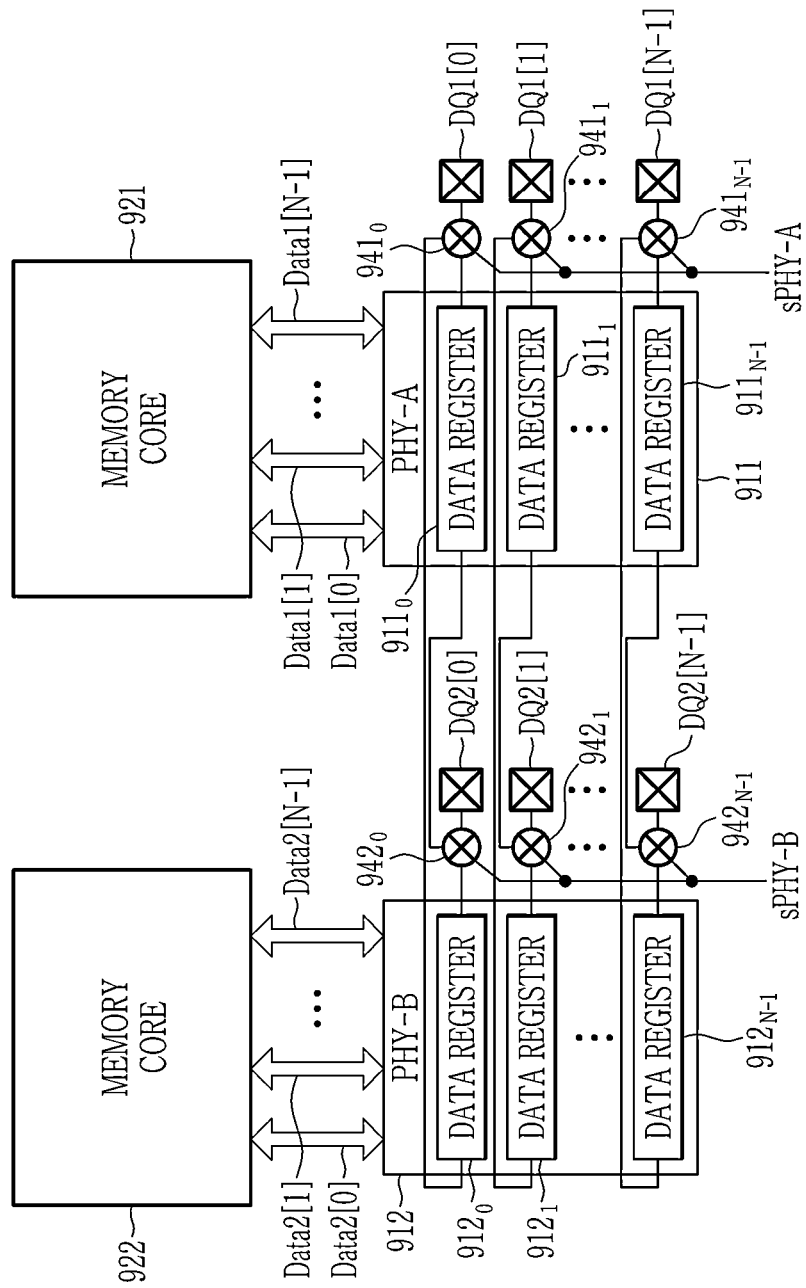

FIGS. 9, 10, and 11 are each a block diagram illustrating an example of a memory device, according to some example embodiments.

Referring to FIG. 9, in some example embodiments, a memory device 900 may include a plurality of physical interfaces 911 and 912, and a plurality of memory cores 921 and 922 that correspond to the plurality of physical interfaces 911 and 912, respectively. Although two physical interfaces 911 and 912 are shown for convenience in FIG. 9, the number of physical interfaces 911 and 912 are not limited thereto. Further, in FIG. 9, the physical interfaces 911 and 912 are denoted as "PHY-A" and "PHY-B", respectively.

In some example embodiments, each of the memory cores 921 and 922 may include a plurality of stacked memory dies. The physical interface 911 may be connected to a plurality of data I/O pins DQ1[0] to DQ1[N−1] of the memory device 900, and the physical interface 912 may be connected to a plurality of other data I/O pins DQ2[0] to DQ2[N−1] of the memory device 900.

In some example embodiments, when an SoC to which the memory device 900 is connected supports one physical interface, either the data I/O pins DQ1[0] to DQ1[N−1] or the data I/O pins DQ2[0] to DQ2[N−1] may be connected to the SoC via data wiring. In some example embodiments, when the SoC supports two or more physical interfaces, the data I/O pins DQ1[0] to DQ1[N−1] and the data I/O pins DQ2[0] to DQ2[N−1] may be connected to the SoC via data wiring.

In some example embodiments, the physical interface 911 may be connected to the corresponding memory core 921 via a plurality of data channels Data1[0] to Data1[N−1], and the physical interface 912 may be connected to the corresponding memory core 922 via a plurality of data channels Data2[0] to Data2[N−1]. Each data channel Data1[i] or Data2[i] may carry a plurality of bits (e.g., 64 bits). Here, i is an integer between 0 and N). In some example embodiments, the plurality of data channels Data1[0] to Data1[N−1] may correspond to the plurality of data I/O pins DQ1[0] to DQ1[N−1], respectively, and the plurality of data channels Data2[0] to Data2[N−1] may correspond to a plurality of data I/O pins DQ2[0] to DQ2[N−1], respectively.

In some example embodiments, the memory device 900 may include a setting circuit for setting at least one physical interface to be used for connection with the SoC among the plurality of physical interfaces 911 and 912. In some example embodiments, the setting circuit may further include select pins 931 and 932 for setting the plurality of physical interfaces 911 and 912, respectively. The select pins 931 and 932 may be provided as hardware pins and may be used to enable the corresponding physical interface.

In some example embodiments, the select pins 931 and 932 may be set such that the plurality of physical interfaces 911 and 912 are used for the connection with the SoC in the memory device 900. For example, the select pins 931 and 932 may be enabled. For example, the physical interface 911 may be connected to the data I/O pins DQ1[0] to DQ1[N−1], and the physical interface 912 may be connected to the data I/O pins DQ2[0] to DQ2[N−1]. Accordingly, in some example embodiments, the physical interface 911 may output data transferred from the memory core 921 through each data channel Data1[i] (e.g., data read from the memory core 921) to the corresponding data I/O pin DQ1[i], and may transfer data input to each data I/O pin DQ1[i] (e.g., data to be written to the memory core 921) to the memory core 621 through the corresponding data channel Data1[i]. Similarly, in some example embodiments, the physical interface 912 may output data transferred from the memory core 922 through each data channel Data2[i] (e.g., data read from the memory core 922) to the corresponding data I/O pin DQ2[i], and may transfer data input to each data I/O pin DQ2[i] (e.g., data to be written to the memory core 922) to the memory core 922 through the corresponding data channel Data2[i].

In some example embodiments, the select pins 931 and 932 may be set such that the physical interface 912 is not used (e.g., the physical interface 911 is used) for the connection to the SoC. For example, the select pin 931 corresponding to the physical interface 911 may be enabled, and the select pin 932 corresponding to the physical interface 912 may be disabled. For example, the physical interface 911 may be connected to the data I/O pins DQ1[0] to DQ1[N−1], and the physical interface 912 may be connected to the data I/O pins DQ1[0] to DQ1[N−1] via the physical interface 911. Thus, in some example embodiments, the physical interface 911 may output data transferred from the memory core 921 through each data channel Data1[i] (e.g., data read from the memory core 921) to the corresponding data I/O pin DQ1[i], and may transfer data input to each data I/O pin DQ1[i] (e.g., data to be written to the memory core 921) to the memory core 921 through the corresponding data channel Data1[i]. The physical interface 912 may output data transferred from the memory core 922 through each data channel Data2[i] (e.g., data read from the memory core 922) to the corresponding data I/O pin DQ1[i] via the physical interface 911. Further, the physical interface 912 may receive data input to each data I/O pin DQ1[i] (e.g., data to be written to the memory core 922) via the physical interface 911, and may transfer the received data to the memory core 922 through the corresponding data channel Data2[i].

In some example embodiments, the select pins 931 and 932 may be set such that physical interface 911 is not used (e.g., the physical interface 912 is used) for the connection to the SoC. For example, the select pin 931 corresponding to the physical interface 911 may be disabled, and the select pin 932 corresponding to the physical interface 912 may be enabled. For example, the physical interface 912 may be connected to the data I/O pins DQ2[0] to DQ2[N−1], and the physical interface 911 may be connected to the data I/O pins DQ2[0] to DQ2[N−1] via the physical interface 912. Accordingly, in some example embodiments, the physical interface 912 may output data transferred from the memory core 922 through each data channel Data2[i] (e.g., data read from the memory core 922) to the corresponding data I/O pin DQ2[i], and may transfer data input to each data I/O pin DQ2[i] (e.g., data to be written to the memory core 922) to the memory core 922 through the corresponding data channel Data2[i]. The physical interface 911 may output data transferred from the memory core 921 through each data channel Data1[i] (e.g., data read from the memory core 921) to the corresponding data I/O pin DQ2[i] via the physical interface 912. Further, the physical interface 911 may receive data input to each data I/O pin DQ2[i] (e.g., data to be written to the memory core 921) via the physical interface 912, and may transfer the received data to the memory core 921 through the corresponding data channel Data1[i].

In some example embodiments, the setting circuit may further include a plurality of select circuits $941_0$ to $941_{N-1}$ for selection of the physical interface 911 and a plurality of select circuits 9420-942N for selection of the physical interface 912. Each select circuit $941_i$ may selectively connect the physical interface 911 to a corresponding data I/O pin DQ1[i] or the physical interface 912, and each select circuit $942_i$ may selectively connect the physical interface 912 to a corresponding data I/O pin DQ2[i] or the physical interface 911. When the select pins 931 and 932 are set to use the plurality of physical interfaces 911 and 912 (e.g., when the select pins 931 and 932 are enabled), each select circuit $941_i$ may connect the physical interface 911 to the corresponding data I/O pin DQ1[i], and each select circuit $942_i$ may connect the physical interface 912 to the corresponding data I/O pin DQ2[i]. When the select pins 931 and 932 are set to disable the physical interface 912 (e.g., when the select pin 931 is enabled and the select pin 932 is disabled), each select circuit $941_i$ may connect the physical interface 911 to the corresponding data I/O pin DQ1[i], and each select circuit $942_i$ may connect the physical interface 912 to the physical interface 911. When the select pins 931 and 932 are set to disable the physical interface 911 (e.g., when the select pin 931 is disabled and the select pin 932 is enabled), each select circuit $941_i$ may connect the physical interface 911 to the physical interface 912, and each select circuit $942_i$ may connect the physical interface 912 to the corresponding data I/O pin DQ2[i].

In some example embodiments, the select pin 931 may be connected to the plurality of select circuits $941_0$ to $941_{N-1}$, and the select pin 932 may be connected to the plurality of select circuits $942_0$ to $942_{N-1}$. A signal iPHY-A input to the select circuits $941_0$ to $941_{N-1}$ may have a predetermined level (e.g., a first level) in response to enabling the select pin 931, and each select circuit $941_i$ may connect the physical interface 911 to the corresponding data I/O pin DQ1[i] in response to the predetermined level of the signal iPHY-A. The signal iPHY-A input to the select circuits $941_0$ to $941_{N-1}$ may have a level (e.g., a second level) different from the predetermined level in response to disabling the select pin 931, and each select circuit $941_i$ may connect the physical interface 911 to the physical interface 912 in response to the second level of the signal iPHY-A. A signal iPHY-B input to the select circuits $942_0$ to $942_{N-1}$ may have the first level in response to enabling the select pin 932, and each select circuit $942_i$ may connect the physical interface 912 to the corresponding data I/O pin DQ2[i] in response to the first level of the signal iPHY-B. The signal iPHY-B input to the select circuits $942_0$ to $942_{N-1}$ may have the second level in response to disabling the select pin 932, and each select circuit $942_i$ may connect the physical interface 912 to the physical interface 911 in response to the second level of the signal iPHY-B.

As described above, in some example embodiments, when the SoC supports two or more physical interfaces, the memory device 900 may be connected to the SoC via the plurality of physical interfaces 911 and 912, depending on the setting of the select pins 931 and 932. When the SoC supports one physical interface, the memory device 900 may be connected to the SoC via one physical interface 911 or 912, depending on the setting of the select pins 931 and 932.

Referring to FIG. 10, in some example embodiments, a physical interface 911 may include a plurality of data registers $911_0$ to $911_{N-1}$, and the physical interface 912 may include a plurality of data registers $912_0$ to $912_{N-1}$.

In some example embodiments, select pins 931 and 932 may be set such that the plurality of physical interfaces 911 and 912 are used for connection with an SoC in a memory device 900. For example, the select pins 931 and 932 may be enabled. For example, the plurality of data registers $911_0$ to $911_{N-1}$ may be connected to a plurality of data I/O pins DQ1[0] to DQ1[N−1], respectively, and the plurality of data registers $912_0$ to $912_{N-1}$ may be connected to a plurality of data I/O pins DQ2[0] to DQ2[N−1], respectively. Accordingly, in a read operation, each data register $911_i$ of the physical interface 911 may output data read from a memory core 921 via a corresponding data I/O pin DQ1[i], and each data register $912_i$ of the physical interface 912 may output data read from a memory core 922 via a corresponding data I/O pin DQ2[i]. In a write operation, each data register $911_i$ of the physical interface 911 may receive data to be written to the memory core 921 via the corresponding data I/O pin DQ1[i], and each data register $912_i$ of the physical interface 912 may receive data to be written to the memory core 922 via the corresponding data I/O pin DQ2[i].

In some example embodiments, the select pins 931 and 932 may be set such that the physical interface 912 is not used (e.g., the physical interface 911 is used) for the connection with the SoC. For example, the select pin 931 may be enabled, and the select pin 932 may be disabled. For example, the plurality of data registers $911_0$ to $911_{N-1}$ may be connected to the plurality of data I/O pins DQ1[0] to DQ1[N−1], respectively, and the plurality of data registers $912_0$ to $912_{N-1}$ may be connected to the plurality of data registers $911_0$ to $911_{N-1}$, respectively. Accordingly, in a read operation, each data register $911_i$ of the physical interface 911 may output data read from the memory core 921 via the corresponding data I/O pin DQ1[i], and then receive data read from the memory core 922 from a corresponding data register 912$_i$ of the physical interface 912 and output the received data via the corresponding data I/O pin DQ1[i]. In a write operation, each data register 911$_i$ of the physical interface 911 may receive data to be written to the memory core 922 via the corresponding data I/O pin DQ1[i] and transfer the received data to the corresponding data register 912$_i$ of the physical interface 912, and then receive data to be written to the memory core 921 via the corresponding data I/O pin DQ1[i].

In some example embodiments, the select pins 931 and 932 may be set such that the physical interface 911 is not used (e.g., the physical interface 912 is used) for the connection with the SoC. For example, the select pin 931 may be disabled, and the select pin 932 may be enabled. For example, the plurality of data registers 911$_0$ to 911$_{N-1}$ may be connected to the plurality of data registers 912$_0$ to 912$_{N-1}$, respectively, and the plurality of data registers 912$_0$ to 912$_{N-1}$ may be connected to the plurality of data I/O pins DQ2[0] to DQ2[N−1], respectively. Accordingly, in a read operation, each data register 912$_i$ of the physical interface 912 may output data read from the memory core 922 via the corresponding data I/O pin DQ2[i], and then receive data read from the memory core 921 from a corresponding data register 911$_i$ of the physical interface 911 and output the received data via the corresponding data I/O pin DQ2[i]. In a write operation, each data register 912$_i$ of the physical interface 912 may receive data to be written to the memory core 921 via the corresponding data I/O pin DQ2[i] and transfer the received data to the corresponding data register 911$_i$ of the physical interface 911, and then receive data to be written to the memory core 922 via the corresponding data I/O pin DQ2[i].

In some example embodiments, each select circuit 941$_i$ may selectively connect a corresponding data register 911$_i$ of the physical interface 911 to a corresponding data I/O pin DQ1[i] or a corresponding data register 912$_i$ of the physical interface 912, and each select circuit 942$_i$ may selectively connect a corresponding data register 912$_i$ of the physical interface 912 to a corresponding data I/O pin DQ2[i] or a corresponding data register 911$_i$ of the physical interface 911. In some example embodiments, when the select pins 931 and 932 are set to use the plurality of physical interfaces 911 and 912, each select circuit 941$_i$ may connect the corresponding data register 911$_i$ of the physical interface 911 to the corresponding data I/O pin DQ1[i], and each select circuit 942$_i$ may connect the corresponding data register 912$_i$ of the physical interface 912 to the corresponding data I/O pin DQ2[i]. In some example embodiments, when the select pins 931 and 932 are set to disable the physical interface 912, each select circuit 941$_i$ may connect the corresponding data register 911$_i$ of the physical interface 911 to the corresponding data I/O pin DQ1[i], and each select circuit 942$_i$ may connect the corresponding data register 912$_i$ of the physical interface 912 to the corresponding data register 911$_i$ of the physical interface 911. In some example embodiments, when the select pins 931 and 932 are set to disable the physical interface 911, each select circuit 941$_i$ may connect the corresponding data register 911$_i$ of the physical interface 911 to the corresponding data register 912$_i$ of the physical interface 912, and each select circuit 942$_i$ may connect the corresponding data register 912$_i$ of the physical interface 912 to the corresponding data I/O pin DQ2[i].

In some example embodiments, a signal iPHY-A input to each select circuit 941$_i$ may have a first level in response to enabling the select pin 931, and each select circuit 941$_i$ may connect the corresponding data register 911$_i$ of the physical interface 911 to the corresponding data I/O pin DQ1[i] in response to the first level of the signal iPHY-A. The signal iPHY-A input to each select circuit 941$_i$ may have a second level in response to disabling the select pin 931, and each select circuit 941$_i$ may connect the corresponding data register 911$_i$ of the physical interface 911 to the corresponding data register 912$_i$ of the physical interface 912 in response to the second level of the signal iPHY-A. Similarly, a signal iPHY-B input to each select circuit 942$_i$ may have the first level in response to enabling the select pin 932, and each select circuit 942$_i$ may connect the corresponding data register 912$_i$ of the physical interface 912 to the corresponding data I/O pin DQ2[i] in response to the first level of the signal iPHY-B. The signal iPHY-B input to each select circuit 942$_i$ may have the second level in response to disabling the select pin 932, and each select circuit 942$_i$ may connect the corresponding data register 912$_i$ of the physical interface 912 to the corresponding data register 911$_i$ of the physical interface 911 in response to the second level of the signal iPHY-B.

In this way, by setting the hardware pins 931 and 932, the memory device 900 may be used in both the SoC supporting the plurality of physical interfaces and the SoC supporting one physical interface. Further, when connecting the memory device 900 to the SoC supporting one physical interface, the setting of the hardware pins 931 and 932 may determine a physical interface to be used for the connection among the plurality of physical interfaces 911 and 912.

Referring to FIG. 11, in some example embodiments, unlike the example embodiments described with reference to FIGS. 9 and 10, select pins 931 and 932 may not be used to control activation of the physical interfaces 911 and 912. For example, a plurality of select circuits 941$_0$ to 941$_{N-1}$ may receive a control signal sPHY-A, and a plurality of select circuits 942$_0$ to 942$_{N-1}$ may receive a control signal sPHY-B. In some example embodiments, a memory controller (e.g., 121 in FIG. 1) of an SoC to which a memory device 900 is connected may provide the control signal sPHY-A to the plurality of select circuits 941$_0$ to 941$_{N-1}$ and the control signal sPHY-B to the plurality of select circuits 942$_0$ to 942$_{N-1}$. In some other example embodiments, control logic formed on a buffer die (e.g., 420 in FIG. 4 or 5) of memory device 900 may provide the control signal sPHY-A to the plurality of select circuits 941$_0$ to 941$_{N-1}$ and the control signal sPHY-B to the plurality of select circuits 942$_0$ to 942$_{N-1}$.

In some example embodiments, when the physical interface 911 is used, the control signal sPHY-A may have a predetermined level (e.g., a first level). When the physical interface 911 is not used, the control signal sPHY-A may have a different level (e.g., a second level) than the predetermined level. Similarly, in some example embodiments, when the physical interface 912 is used, the control signal sPHY-B may have the first level. When the physical interface 912 is not used, the control signal sPHY-B may have the second level. In response to the first level of the control signal SPHY-A, each select circuit 941$_i$ may connect the physical interface 911 to a corresponding data I/O pin DQ1[i], or may connect a corresponding data register 911$_i$ of the physical interface 911 to the corresponding data I/O pin DQ1[i]. In response to the second level of the control signal sPHY-A, each select circuit 941$_i$ may connect the physical interface 911 to the physical interface 912, or connect the corresponding data register 911$_i$ of the physical interface 911 to a corresponding data register 912$_i$ of the physical interface 912. Similarly, in response to the first level of the control signal sPHY-B, each select circuit $942_i$ may connect the physical interface 912 to a corresponding data I/O pin DQ2[i], or may connect a corresponding data register $912_i$ of the physical interface 912 to the corresponding data I/O pin DQ2[i]. In response to the second level of the control signal sPHY-B, each select circuit $942_i$ may connect the physical interface 912 to the physical interface 911, or connect the corresponding data register $912_i$ of the physical interface 912 to the corresponding data register $911_i$ of the physical interface 911.

As described above, by setting the levels of the control signals sPHY-A and sPHY-B provided to the memory device 900, the memory device 900 may be used in both the SoC supporting the plurality of physical interfaces and the SoC supporting one physical interface. Further, when the memory device 900 is connected to the SoC supporting one physical interface, the memory device 900 may determine a physical interface to be used for the connection among the plurality of physical interfaces 911 and 912 by setting the select pins 931 and 932.

As described herein, one or more of the elements disclosed above may include or be implemented in one or more processing circuitries such as hardware including logic circuits; a hardware/software combination such as a processor executing software; or a combination thereof. For example, the processing circuitries more specifically may include, but are not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Any of the memories described herein may be a non-volatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

While the inventive concepts have been shown and described with reference to some example embodiments thereof, it will be understood that various changes in form and details may be made therein without departing form the spirit and scope of the following claims.

What is claimed is:

1. A memory device comprising:
    a first physical interface;
    a first memory core assigned to the first physical interface, and comprising a plurality of first stacked memory dies connected via a first through electrode, the plurality of first stacked memory dies being continuously stacked;
    a second physical interface;
    a second memory core assigned to the second physical interface, and comprising a plurality of second stacked memory dies connected via a second through electrode, the plurality of second stacked memory dies being continuously stacked; and
    a setting circuit configured to set at least one physical interface to be used for connection with an external device of the memory device among a plurality of physical interfaces comprising the first physical interface and the second physical interface,
    wherein the setting circuit is configured to select the first physical interface in response to the external device supporting one physical interface, and select the first physical interface and the second physical interface in response to the external device supporting two or more physical interfaces.

2. The memory device of claim 1, wherein the first physical interface and the second physical interface are disposed on a same buffer die.

3. The memory device of claim 1, wherein a burst length of the memory device where the first physical interface is used for the connection with the external device is twice the burst length of the memory device where the first physical interface and the second physical interface are used for the connection with the external device.

4. The memory device of claim 1, wherein the setting circuit comprises a hardware pin configured to select the at least one physical interface among the plurality of physical interfaces.

5. The memory device of claim 4, wherein the first physical interface is connected to the external device, and
    wherein the hardware pin is configured to connect the second physical interface to the external device in response to being enabled, and connect the second physical interface to the first physical interface in response to being disabled.

6. The memory device of claim 4, wherein the hardware pin comprises:
    a first select pin configured to connect the first physical interface to the external device in response to being enabled, and connect the second physical interface to the first physical interface in response to being disabled; and
    a second select pin configured to connect the second physical interface to the external device in response to being enabled, and connect the second physical interface to the first physical interface in response to being disabled.

7. The memory device of claim 1, wherein the first physical interface is connected to the external device, and
    wherein the setting circuit is further configured to connect the second physical interface to the external device in response to a first level of a control signal, and connect the second physical interface to the first physical interface in response to a second level of the control signal.

8. The memory device of claim 1, wherein the setting circuit is further configured to:
    connect the first physical interface to the external device in response to a first level of a first control signal;
    connect the first physical interface to the second physical interface in response to a second level of the first control signal;
    connect the second physical interface to the external device in response to the first level of a second control signal; and
    connect the second physical interface to the first physical interface in response to the second level of the second control signal.

9. The memory device of claim 1, further comprising:
    a plurality of first data input/output pins connected to the first physical interface; and
    a plurality of second data input/output pins,
    wherein the setting circuit is further configured to selectively connect the second physical interface to the plurality of second data input/output pins or the first physical interface.

10. The memory device of claim 9, wherein the first physical interface comprises a plurality of first data registers connected to the plurality of first data input/output pins, respectively, wherein the second physical interface comprises a plurality of second data registers,
wherein the setting circuit comprises a plurality of select circuits connected to the plurality of second data registers, respectively, and
wherein each of the plurality of select circuits is configured to selectively connect a corresponding second data register among the plurality of second data registers to a corresponding second data input/output pin among the plurality of second data input/output pins or a corresponding first data register among the plurality of first data registers.

11. The memory device of claim 1, further comprising:
a plurality of first data input/output pins; and
a plurality of second data input/output pins,
wherein the setting circuit is further configured to selectively connect the first physical interface to the plurality of first data input/output pins or the second physical interface, and selectively connect the second physical interface to the plurality of second data input/output pins or the first physical interface.

12. The memory device of claim 11, wherein the first physical interface comprises a plurality of first data registers,
wherein the second physical interface comprises a plurality of second data registers,
wherein the setting circuit comprises:
a plurality of first select circuits connected to the plurality of first data registers, respectively; and
a plurality of second select circuits connected to the plurality of second data registers, respectively,
wherein each of the plurality of first select circuits is configured to selectively connect a corresponding first data register among the plurality of first data registers to a corresponding first data input/output pin among the plurality of first data input/output pins, or a corresponding second data register among the plurality of second data registers, and
wherein each of the plurality of second select circuits is configured to selectively connect a corresponding second data register among the plurality of second data registers to a corresponding second data input/output pin among the plurality of second data input/output pins or a corresponding first data register among the plurality of first data registers.

13. A memory device comprising:
a plurality of physical interfaces comprising a first physical interface and a second physical interface;
a plurality of memory cores assigned to the plurality of physical interfaces, respectively;
a plurality of data input/output pins corresponding to the plurality of physical interfaces, respectively, and configured to be used for connection with an external device of the memory device, the plurality of data input/output pins comprising a first data input/output pin corresponding to the first physical interface; and
a setting circuit configured to selectively connect the first physical interface to the first data input/output pin or the second physical interface,
wherein each of the plurality of memory cores comprises a plurality of stacked memory dies connected via a through electrode and continuously stacked, and
wherein the setting circuit is configured to select the first physical interface in response to the external device supporting one physical interface, and select the first physical interface and the second physical interface in response to the external device supporting two or more physical interfaces.

14. The memory device of claim 13, wherein the plurality of physical interfaces are disposed on a same buffer die.

15. The memory device of claim 13, wherein the setting circuit comprises a hardware pin configured to control connection of the first physical interface.

16. The memory device of claim 13, wherein the setting circuit is further configured to control connection of the first physical interface in response to a control signal.

17. The memory device of claim 13, wherein the first physical interface comprises a first data register,
wherein the second physical interface comprises a second data register,
wherein the setting circuit is further configured to selectively connect the first data register of the first physical interface to the first data input/output pin or the second data register of the second physical interface.

18. An electronic device comprising:
a computing device; and
a memory device comprising:
a plurality of physical interfaces comprising a first physical interface connected to the computing device and a second physical interface;
a plurality of memory cores assigned to the plurality of physical interfaces, respectively, each of the plurality of memory cores comprising a plurality of stacked memory dies connected via a through electrode and continuously stacked; and
a setting circuit configured to selectively connect the second physical interface to the computing device or the first physical interface,
wherein the setting circuit is configured to select the first physical interface in response to the computing device supporting one physical interface, and select the first physical interface and the second physical interface in response to the computing device supporting two or more physical interfaces.

19. The electronic device of claim 18, wherein the setting circuit comprises a hardware pin configured to set connection of the second physical interface.

20. The memory device of claim 1, wherein the first memory core and the second memory core are on different regions of a same buffer die.

* * * * *